United States Patent
Hong et al.

(10) Patent No.: US 10,103,392 B2
(45) Date of Patent: Oct. 16, 2018

(54) MEMBRANE-ELECTRODE ASSEMBLY (MEA) FOR FUEL CELLS

(71) Applicant: Hyundai Motor Company, Seoul (KR)

(72) Inventors: Bo Ki Hong, Seoul (KR); Kook Il Han, Seongnam-si (KR); Ji Yeon Park, Seoul (KR); Byeong Heon Jeong, Seongnam-si (KR); Sang Hyun Cho, Hwaseong-si (KR); Chae Won Lim, Uijeongbu-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 101 days.

(21) Appl. No.: 14/308,534

(22) Filed: Jun. 18, 2014

(65) Prior Publication Data

US 2015/0188155 A1 Jul. 2, 2015

(30) Foreign Application Priority Data

Dec. 30, 2013 (KR) ........................ 10-2013-0166747

(51) Int. Cl.
| | |
|---|---|
| *H01M 8/02* | (2016.01) |
| *H01M 8/04* | (2016.01) |
| *H01M 8/0271* | (2016.01) |
| *H01M 8/0276* | (2016.01) |
| *H01M 8/0297* | (2016.01) |

(Continued)

(52) U.S. Cl.
CPC ....... *H01M 8/0271* (2013.01); *H01M 8/0276* (2013.01); *H01M 8/0297* (2013.01); *H01M 8/1004* (2013.01); *H01M 2008/1095* (2013.01); *H01M 2250/20* (2013.01); *Y02E 60/521* (2013.01)

(58) Field of Classification Search
CPC ..................................... H01M 8/0271–8/0297
See application file for complete search history.

(56) References Cited

U.S. PATENT DOCUMENTS

| | | | | |
|---|---|---|---|---|
| 3,847,651 A | * | 11/1974 | Holden | .................... B05D 7/16 427/407.1 |
| 5,502,106 A | * | 3/1996 | LaFleur | ................ C08L 101/00 525/165 |

(Continued)

FOREIGN PATENT DOCUMENTS

| | | |
|---|---|---|
| CN | 101278429 A | 10/2008 |
| CN | 102132448 A | 7/2011 |

(Continued)

OTHER PUBLICATIONS

Chinese Office Action issued in Application No. 201410329494.8 dated Feb. 5, 2018.

*Primary Examiner* — Jonathan Crepeau
*Assistant Examiner* — Jacob Buchanan
(74) *Attorney, Agent, or Firm* — McDermott Will & Emery LLP

(57) ABSTRACT

A membrane-electrode assembly (MEA) for fuel cells includes an electricity-generating array including an anode, a cathode, and an electrolyte membrane. A subgasket array includes an anode subgasket surrounding a periphery of the anode and a cathode subgasket surrounding a periphery of the cathode. A junction array includes a polar junction and a nonpolar junction surrounding a periphery of the electrolyte membrane and attaching the anode subgasket and the cathode subgasket to each other.

9 Claims, 3 Drawing Sheets

(51) Int. Cl.
*H01M 8/1004* (2016.01)
*H01M 8/1018* (2016.01)

(56) References Cited

U.S. PATENT DOCUMENTS

| | | | |
|---|---|---|---|
| 5,882,817 A * | 3/1999 | Hall | B29C 37/0085 |
| | | | 429/155 |
| 5,955,035 A * | 9/1999 | Dinzburg | B29B 13/08 |
| | | | 422/128 |
| 2001/0051294 A1* | 12/2001 | Inoue | H01M 8/0271 |
| | | | 429/481 |
| 2003/0027032 A1* | 2/2003 | Sugita | H01M 8/0273 |
| | | | 429/483 |
| 2004/0115499 A1 | 6/2004 | Tani et al. | |
| 2007/0020502 A1* | 1/2007 | Cho | H01M 8/0273 |
| | | | 429/483 |
| 2007/0134538 A1* | 6/2007 | Yuichi | H01M 8/0273 |
| | | | 429/482 |
| 2009/0142639 A1* | 6/2009 | Gregorski | H01M 8/0273 |
| | | | 429/486 |
| 2009/0286121 A1* | 11/2009 | Morimoto | H01M 8/0273 |
| | | | 429/494 |
| 2011/0065016 A1* | 3/2011 | Sata | H01M 8/0223 |
| | | | 429/469 |

FOREIGN PATENT DOCUMENTS

| | | |
|---|---|---|
| JP | 2010-062040 A | 3/2010 |
| JP | 2010-186711 A | 8/2010 |
| KR | 10-2007-0072987 A | 7/2007 |

* cited by examiner

[FIG. 1]
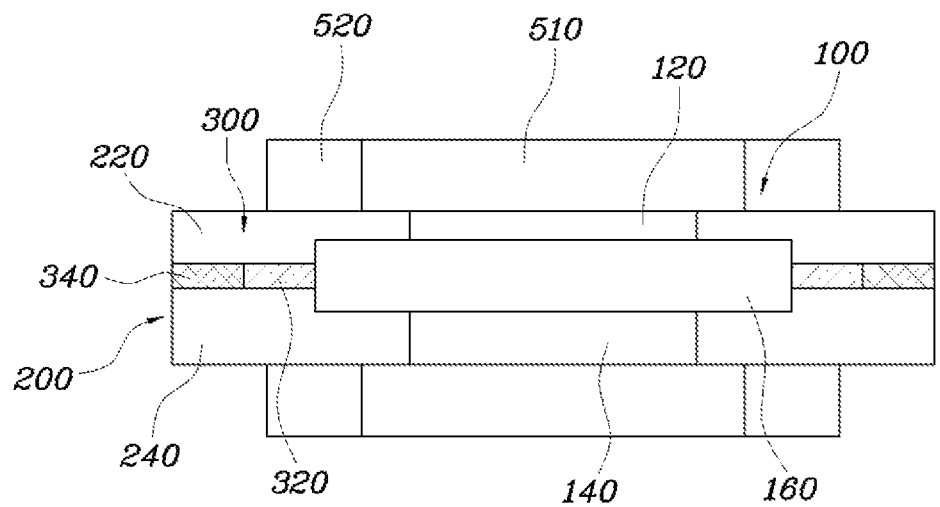
[FIG. 2]
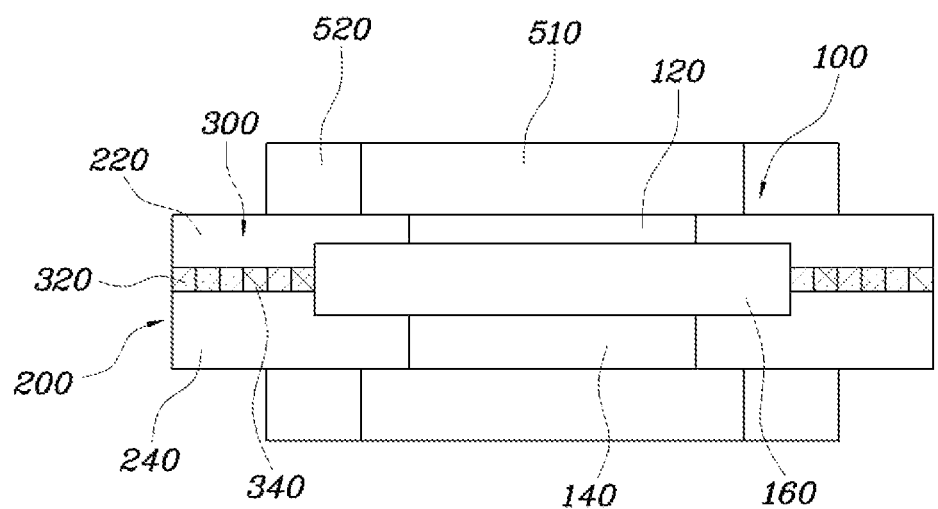

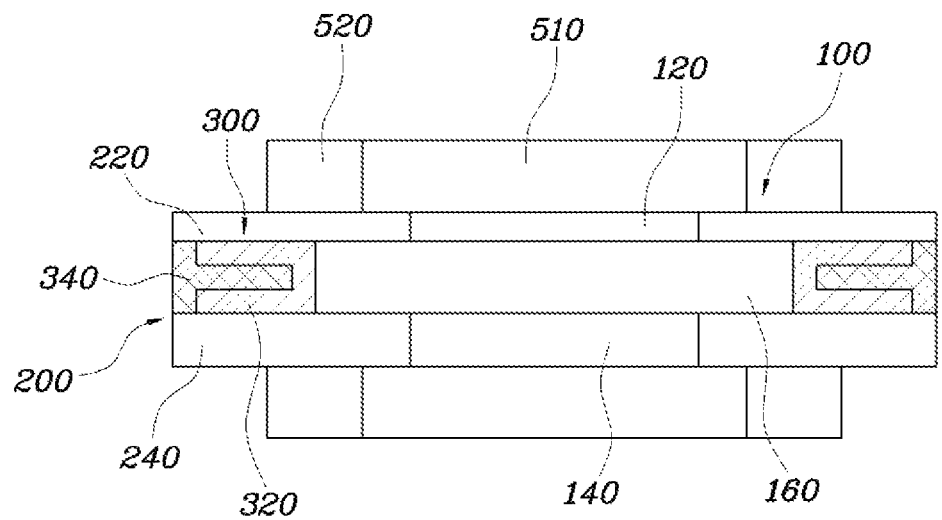
[FIG. 3]
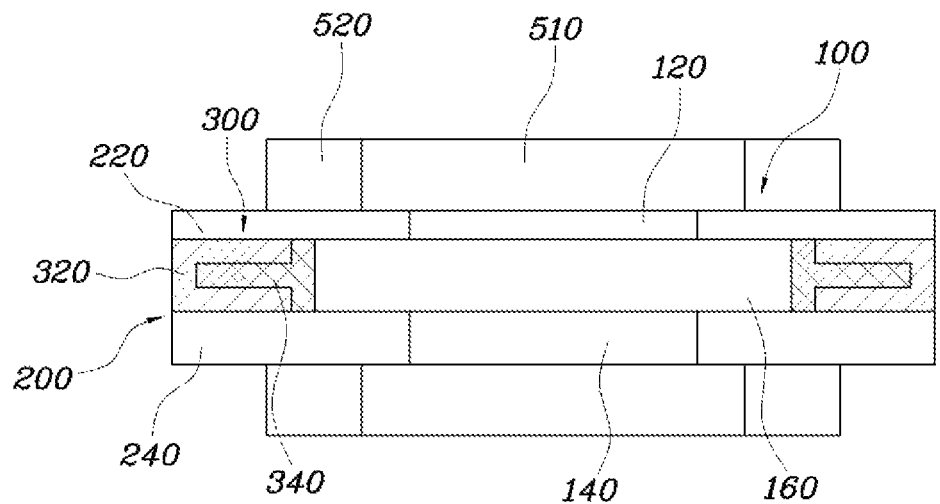
[FIG. 4]

[FIG. 5]
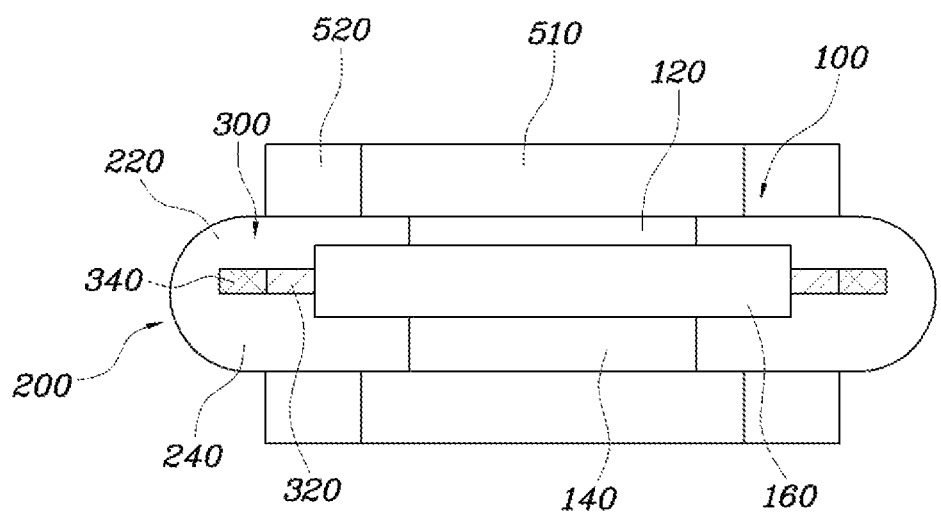

MEMBRANE-ELECTRODE ASSEMBLY (MEA) FOR FUEL CELLS

CROSS REFERENCE TO RELATED APPLICATION

The present application claims the benefit of priority to Korean Patent Application No. 10-2013-0166747, filed on Dec. 30, 2013, the entire contents of which is incorporated herein for all purposes by this reference.

TECHNICAL FIELD

The present disclosure relates to a membrane-electrode assembly (MEA) for fuel cells, wherein a length of an electrolyte membrane located at the outside of an active area of the MEA is shorter than that of a subgasket, an adhesive applied on the subgasket is formed into a polar adhesive block and a non-polar adhesive block, and the subgasket is attached to the electrolyte membrane by thermal lamination, thereby preventing water charged in the electrolyte membrane from being diffused and discharged to the outside of the MEA.

BACKGROUND

Generally, a polymer electrolyte membrane fuel cell (PEMFC) is used as a fuel cell for automobiles. In order for this polymer electrolyte membrane fuel cell to normally exhibit a high-power performance of several tens of kilowatts (kW) or more under various operation conditions, it needs to be stably operated in a wide current density range.

In the polymer electrolyte membrane fuel cell, an electrochemical reaction for generating electricity takes place in a membrane-electrode assembly (MEA) including a perfluoro-sulfonic acid membrane and an electrode pair of anode and cathode. In the membrane-electrode assembly, hydrogen supplied to the anode (oxidation electrode) is dissociated into hydrogen ions (protons) and electrons. Then, the hydrogen ions are transferred to the cathode (reduction electrode) through the membrane, the electrons are transferred to the cathode through an external circuit, and the hydrogen ions and electrons transferred to the cathode react with oxygen molecules to generate electricity, heat, and byproduct water ($H_2O$). In this case, when a suitable amount of water is produced during the electrochemical reaction in the fuel cell, the humidity of the membrane-electrode assembly can be maintained, but when an excess amount of water is produced, a water flooding phenomenon occurs at a high current density if it is not properly removed, and the flooded water inhibits reaction gases from being efficiently supplied into the fuel cell, thereby increasing a voltage loss.

In the electrochemical reaction of the fuel cell, when hydrogen ions are transferred from the anode to the cathode through the membrane, they are bonded with water molecules in the form of hydronium ions ($H_3O^+$) to drag water molecules. This phenomenon is referred to as "electro-osmotic drag (EOD)". When the amount of water accumulated in the cathode increases, a part of water is reversely transferred from the cathode to the anode, which is referred to as "back diffusion (BD)". Therefore, in order for the fuel cell to obtain an excellent cell performance, these water transfer phenomena need to be clearly understood, and the water existing in the fuel cell needs to be efficiently used.

Generally, a fuel cell vehicle uses a fuel cell stack which is a laminate of several hundreds of unit cells. This unit cell includes a membrane-electrode assembly (MEA), a gas diffusion layer (GDL), a gasket, and a separator. The gas diffusion layer must be attached to the anode and cathode of the MEA. In this case, in order to improve the handling property of the MEA, high stiffness is needed. Further, the MEA receives compression pressure for a long time through a gasket made of elastic rubber, and thus, this gasket needs to maintain its form without being torn or deformed even under a compression condition. For this purpose, a solid phase film-type subgasket is generally attached to the periphery of a membrane by thermal lamination. In the subgasket lamination process, in order to improve the adhesion between the membrane and the subgasket, an adhesive may be used together with heat, but may not be used according to material properties of the subgasket and a required adhesivity. As such, when the MEA provided with the subgasket is used, the fuel cell stack can be used for a long time even though it is laminated with several hundreds of MEAs.

In the above conventional MEA structure, in order to enhance the attachment of the subgasket to the membrane, the membrane is extended to the outer wall of a fuel cell and then attached to the subgasket in addition to the active area in which the anode and cathode used in the electrochemical reaction of the fuel cell are attached to the membrane. However, in this MEA structure, a large expensive membrane needs to be used, and particularly, undesired water diffusion occurs. Thus, water to be used for a fuel cell reaction is lost, and corrosion of other fuel stack components made of metal materials is accelerated, thereby greatly deteriorating operation stability of an automobile.

As another conventional technology, there is a proposed method of attaching a subgasket to an MEA using injection molding, rather than thermal lamination. However, in this method, the MEA is deformed or contaminated during the injection molding of the subgasket. Further, a complicated multi-step process needs to be used in order to overcome this problem. Therefore, this method is also problematic in that the subgasket attaching process becomes complicated compared to when thermal lamination is used, and in that the productivity thereof is lowered.

It is to be understood that the foregoing description is provided to merely aid the understanding of the present disclosure, and does not mean that the present disclosure falls under the purview of the related art which was already known to those skilled in the art.

SUMMARY

The present disclosure has been devised to solve the above-mentioned problems. An aspect of the present disclosure provides a membrane-electrode assembly (MEA) for fuel cells, wherein a length of an electrolyte membrane located at the outside of an active area of the MEA is shorter than that of a subgasket. An adhesive applied on the subgasket is formed into a polar adhesive block and a non-polar adhesive block, and the subgasket is attached to the electrolyte membrane by thermal lamination. Thereby, water charged in the electrolyte membrane is prevented from being diffused and discharged to the outside of the MEA.

According to an exemplary embodiment of the present disclosure, a membrane-electrode assembly (MEA) for fuel cells includes an electricity-generating array including an anode, a cathode, and an electrolyte membrane. A subgasket array includes an anode subgasket surrounding a periphery of the anode and a cathode subgasket surrounding a periphery of the cathode. A junction array includes a polar junction and a nonpolar junction surrounding a periphery of the electrolyte membrane and attaching the anode subgasket and the cathode subgasket to each other.

The electrolyte membrane may be longer than the anode and the cathode and protrude from lateral sides of the anode and the cathode.

The anode subgasket and the cathode subgasket may be formed such that they protrude from a lateral side of the electrolyte membrane.

The junction array may be disposed on the periphery of the electrolyte membrane and may be interposed between the anode subgasket and the cathode subgasket to attach the anode subgasket and the cathode subgasket to each other.

Edges of the anode subgasket and the cathode subgasket may be laser-welded.

The junction array may be configured such that polar junctions and non-polar junctions are alternately arranged between the anode subgasket and the cathode subgasket.

The junction array may include a plurality of polar junctions and a plurality of non-polar junctions, and these polar junctions and non-polar junctions are alternately arranged between the anode subgasket and the cathode subgasket.

The junction array may be configured such that the polar junctions and the non-polar junctions are alternately arranged along the periphery of the electrolyte membrane.

The junction array may be configured such that the polar junction is adjacent to the electrolyte membrane, the non-polar junction surrounds a lateral side of the polar junction, and a convex portion of the non-polar junction is inserted in a concave portion of the polar junction.

The junction array may be configured such that the non-polar junction is adjacent to the electrolyte membrane, the polar junction surrounds a lateral side of the non-polar junction, and the convex portion of the non-polar junction is inserted in the concave portion of the polar junction.

BRIEF DESCRIPTION OF THE DRAWINGS

The above and other objects, features and advantages of the present disclosure will be more clearly understood from the following detailed description taken in conjunction with the accompanying drawings.

FIGS. 1 to 5 are sectional views showing membrane-electrode assemblies (MEAs) for fuel cells according to various embodiments of the present disclosure.

DETAILED DESCRIPTION

Hereinafter, exemplary embodiments of the present disclosure will be described in detail with reference to the attached drawings. FIGS. 1 to 5 are sectional views showing MEAs for fuel cells according to various embodiments of the present disclosure.

Referring to FIG. 1, the membrane-electrode assembly (MEA) for fuel cells according to the present disclosure includes an electricity-generating array 100 including an anode 120, a cathode 140 and an electrolyte membrane 160. A subgasket array 200 includes an anode subgasket 220 surrounding a periphery of the anode 120 and a cathode subgasket 240 surrounding the periphery of the cathode 140. A junction array 300 includes a polar junction 320 and a nonpolar junction 340 surrounding a periphery of the electrolyte membrane 160 and attaching the anode subgasket 220 and the cathode subgasket 240 to each other. Here, the order of the polar junction 320 and the non-polar junction 340 may be changed with each other. The MEA includes gas diffusion layers (GDL) 510 and gaskets 520 on opposing sides of the electricity-generating array 100.

The present disclosure provides an MEA subgasket structure which can directly exhibit major functions of the subgaskets 220 and 240 and simultaneously can prevent water charged in the electrolyte membrane 160 from being discharged to the outside of a fuel cell. The present disclosure provides the MEA for fuel cells which is manufactured by thermal lamination, rather than injection molding and which can reduce a loss of an electrolyte membrane and prevent the water charged in the electrolyte membrane from being unnecessarily discharged to the outside of the fuel cell because a length of the electrolyte membrane is shorter than that of the conventional electrolyte membrane. In this thermal lamination, a polymer film having a high stiffness is generally used as a subgasket. In this case, in order to obtain adhesion between the electrolyte membrane and the subgasket, a polar adhesive may be used.

However, when only the polar adhesive is used for a long period of time, the water charged in the electrolyte membrane may be discharged to the outside of the fuel cell through this polar adhesive. In contrast, when only a non-polar adhesive having a static contact angle of more than 90° and an excellent hydrophobicity is used, the adhesion between the electrolyte membrane and the subgasket may be greatly decreased.

In the present disclosure, a double-adhesive block assembly structure that uses both polar adhesive and non-polar adhesive is used in order to decrease the usage of the electrolyte membrane compared to the conventional technology by making the length of the electrolyte membrane located at the outside of an active area of the MEA shorter than that of a subgasket and to prevent the water from being discharged to the outside of the MEA.

That is, the electrolyte membrane 160 may protrude from the lateral sides of the anode 120 and the cathode 140 because the electrolyte membrane 160 is longer than the anode 120 and the cathode 140. Further, the anode subgasket 220 and the cathode subgasket 240 may be formed such that they surround the protruding portion of the electrolyte membrane 160.

As such, when the subgaskets are attached to the electrolyte membrane by thermal lamination, water passed through the polar junction 320 to be diffused is blocked by the non-polar junction 340 having a high hydrophobicity, thus preventing the water from being diffused to the outside of the MEA to be discharged to the outside of the fuel cell. In the present disclosure, a thickness of the polar junction 320 and the non-polar junction 340 may be equal to or thinner than that of the electrolyte membrane 160. In this embodiment shown in FIG. 1, the thickness of the polar junction 320 and the non-polar junction is thinner than that of the electrolyte membrane 160.

In the present disclosure, the polar junction 320 and the non-polar junction 340 may be changed in position. In this case, the water charged in the electrolyte membrane 160 is immediately blocked by the non-polar junction 340 directly adjacent to the electrolyte membrane 160, thus preventing water from being diffused to the outside of the MEA.

As shown in FIG. 2, an MEA for fuel cells according to the present disclosure may have a multi-adhesive block assembly structure. When this multi-adhesive block assembly is used, the adhesion between the electrolyte membrane 160 and the subgaskets 220 and 240 can be more uniformly maintained. Further, even though any one non-polar junction 340 does not completely block the water charged in the electrolyte membrane 160, another non-polar junction 340 can additionally block this water. That is, the junction array 300 may be configured such that polar junctions 320 and non-polar junctions 340 are alternately arranged between the anode subgasket 220 and the cathode subgasket 240. Specifically, the junction array 300 includes a plurality of polar junctions 320 and a plurality of non-polar junctions 340. The plurality of polar junctions 320 and non-polar junctions 340 may be alternately arranged between the anode subgasket 220 and the cathode subgasket 240. Further, the junction array 300 may be configured such that the polar junctions 320 and the non-polar junctions 340 are alternately arranged along the periphery of the electrolyte membrane 160.

FIGS. 3 and 4 show MEAs for fuel cells, wherein a double-adhesive block assembly structure is used, the polar junction 320 directly attached to the subgaskets 220 and 240 is longer than the non-polar junction 340 to increase the adhesion between the junctions 320 and 340 and the subgaskets 220 and 240. The polar junction 320 and the non-polar junction 340 are coupled with each other in a convex-concave form to effectively prevent the discharge of water. The junction array 300 shown in FIG. 3 is configured such that the polar junction 320 is adjacent to the electrolyte membrane 160, the non-polar junction 340 surrounds the lateral side of the polar junction 320, and the convex portion of the non-polar junction 340 is inserted in the concave portion of the polar junction 320. The junction array 300 shown in FIG. 4 is configured such that the non-polar junction 340 is adjacent to the electrolyte membrane 160, the polar junction 320 surrounds the lateral side of the non-polar junction 340, and the convex portion of the non-polar junction 340 is inserted in the concave portion of the polar junction 320.

The polar junction may be made of one or a mixture of two or more selected from among epoxy resin, acrylic resin, silicone resin, phenoxy resin, polyamide, polyurethane, cyanoacrylate, polyester, urea formaldehyde, melamine formaldehyde, polyimide, polybenzimidazole, cellulose acetate, cellulose nitrate, polyvinyl acetate, and polyvinyl alcohol.

Further, the non-polar junction may be made of one or a mixture of two or more selected from among polyisobutylene, homopolymer and copolymer of polyethylene, homopolymer and copolymer of polypropylene, and natural rubber. Such polar and non-polar adhesives may include various types of adhesives, such as a liquid adhesive, a film adhesive, a hot-melt adhesive, a pressure-sensitive adhesive, and the like. A film adhesive or hot-melt adhesive having an excellent handling property may be used in attaching the subgaskets of the MEA.

As shown in FIG. 5, edges of the anode subgasket 220 and the cathode subgasket 240 may be laser-welded. Here, a double-adhesive or multi-adhesive block assembly structure that uses both polar junction 320 and non-polar junction 340 may be used, and the total length of adhesive blocks applied onto the subgaskets 220 and 240 may be shorter than that of each of the subgaskets. Under these conditions, the electrolyte membrane is attached to the subgaskets 220 and 240 by thermal lamination, and then the peripheries of the subgaskets 220 not coated with adhesives are additionally laser-welded, thus additionally preventing water from being discharged to the outside of a fuel cell.

The MEA configured in this way is effective in additionally preventing water from being discharged to the outside of the MEA even while using a small amount of an adhesive. In this case, the output power of laser may be 5~100 W since when the output of laser is less than 5 W, a welding activity is very low, and thus, it is difficult to obtain a high adhesively between subgasket films. When the output thereof is more than 100 W, the subgasket films are thermally deformed to excessively increase a thickness of each subgasket, and thus, it is difficult to maintain a stable subgasket shape after laser welding. Particularly, when the laser welding is carried out to such a degree that subgasket films are severely thermal-deformed, the thickness deviation between the subgaskets increases, thus rapidly deteriorating the lamination stability of unit cells in the fuel cell stack which includes several hundreds of laminated MEAs.

Further, the irradiation rate of laser may be 10~600 mm/s since when the irradiation rate of laser is less than 10 mm/s, a junction speed is very low to lower the productivity thereof. When the irradiation rate thereof is more than 600 mm/s, the junction effect thereof becomes relatively low.

As described above, according to the above-configured MEA for fuel cells, an excellent handling property, necessary for the conventional MEA subgasket, can be maintained, the excessive use of an expensive electrolyte membrane can be solved, and the diffusion of water to the outside of a fuel cell can be prevented, thereby increasing the efficiency of water management in the fuel cell and the operation stability of an automobile.

Although the exemplary embodiments of the present disclosure have been disclosed for illustrative purposes, those skilled in the art will appreciate that various modifications, additions, and substitutions are possible, without departing from the scope and spirit of the disclosure as disclosed in the accompanying claims.

What is claimed is:

1. A membrane-electrode assembly (MEA) for fuel cells, comprising:
    an electricity-generating array including an anode, a cathode, and an electrolyte membrane;
    a subgasket array including an anode subgasket surrounding a periphery of the anode and a cathode subgasket surrounding a periphery of the cathode; and
    a junction array including a polar junction and a non-polar junction,
    wherein the subgasket array surrounds an end of the electrolyte membrane,
    wherein the junction array is disposed on the periphery of the electrolyte membrane to be collinear with two ends of the electrolyte membrane, and interposed between the anode subgasket and the cathode subgasket to attach the anode subgasket and the cathode subgasket to each other,
    wherein the junction array is configured such that the polar junction and the non-polar junction are alternately arranged along a plane collinear with the two ends of the electrolyte membrane such that one of the polar junction and the non-polar junction contacts one of the two ends of the electrolyte membrane while other one of the polar junction and the non-polar junction does not contact the one of the two ends of the electrolyte membrane, and
    wherein the polar junction includes a hydrophilic resin composition and the non-polar junction includes a hydrophobic resin composition.

2. The MEA for fuel cells of claim 1, wherein the electrolyte membrane is longer than the anode and the cathode to protrude from lateral sides of the anode and the cathode.

3. The MEA for fuel cells of claim 1, wherein the anode subgasket and the cathode subgasket are formed such that they protrude from a lateral side of the electrolyte membrane.

4. The MEA for fuel cells of claim 3, wherein the junction array is disposed on the periphery of the electrolyte membrane and is interposed between the anode subgasket and the cathode subgasket to attach the anode subgasket and the cathode subgasket to each other.

5. The MEA for fuel cells of claim 1, wherein edges of the anode subgasket and the cathode subgasket are laser-welded.

6. The MEA for fuel cells of claim 1, wherein the junction array includes a plurality of polar junctions and a plurality of non-polar junctions, and the plurality of polar junctions and non-polar junctions are arranged between the anode subgasket and the cathode subgasket.

7. The MEA for fuel cells of claim 6, wherein the junction array is configured such that the plurality of polar junctions and the non-polar junctions are alternately in sequence arranged along the periphery of the electrolyte membrane.

8. The MEA for fuel cells of claim 1, wherein the junction array is configured such that the polar junction is adjacent to the electrolyte membrane, the non-polar junction surrounds a lateral side of the polar junction, and a convex portion of the non-polar junction is inserted in a concave portion of the polar junction.

9. The MEA for fuel cells of claim 1, wherein the junction array is configured such that the non-polar junction is adjacent to the electrolyte membrane, the polar junction surrounds a lateral side of the non-polar junction, and a convex portion of the non-polar junction is inserted in a concave portion of the polar junction.

* * * * *